United States Patent [19]
Trümpler et al.

[11] Patent Number: 5,436,546
[45] Date of Patent: Jul. 25, 1995

[54] METHOD AND APPARATUS FOR SWITCHING BACK A CHANGE-POLE MOTOR

[75] Inventors: Walter Trümpler, Karlsruhe; Josef Schmidt, Graben-Neudorf, both of Germany

[73] Assignee: SEW-EURODRIVE GmbH & Co., Bruchsat, Germany

[21] Appl. No.: 160,791

[22] Filed: Dec. 3, 1993

[30] Foreign Application Priority Data

Dec. 17, 1992 [DE] Germany .............. 42 42 665

[51] Int. Cl.⁶ ............................................. H02P 7/48
[52] U.S. Cl. ..................................... 318/773; 318/768
[58] Field of Search ............... 318/768, 772, 774, 775, 318/777, 773

[56] References Cited

U.S. PATENT DOCUMENTS 3,872,694  3/1975  Sikamori et al. .
4,122,919 10/1978  Anzai .
4,348,626  9/1982  London ................................ 318/772
4,994,725  2/1991  Gschlossl ............................ 318/727

*Primary Examiner*—Bentsu Ro
*Attorney, Agent, or Firm*—Antonelli, Terry, Stout & Kraus

[57] ABSTRACT

To enable a gentle switching back of a change-pole motor to a low speed while ensuring the full moment or torque on passing into motor operation, a method for switching back the change-pole motor to the lower speed is proposed wherein initially there is a two-phase switching back to the lower speed, and wherein, on dropping below the predetermined switching current, the third phase is switched in. For this purpose, an ammeter is provided in the switched-in phase, with a comparator being provided for comparing the actual current with the predetermined switching current, and with a switch also being provided in the third phase to be switched in.

17 Claims, 3 Drawing Sheets

K1 = SLOW SPEED
K2 = FAST SPEED

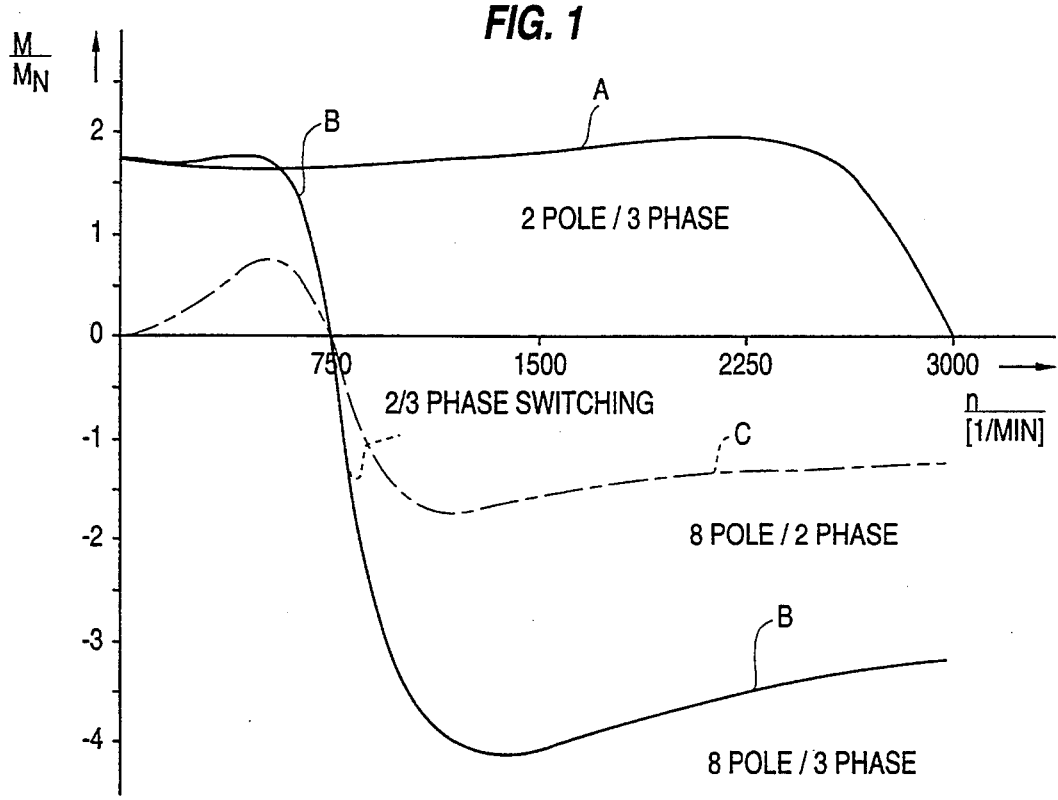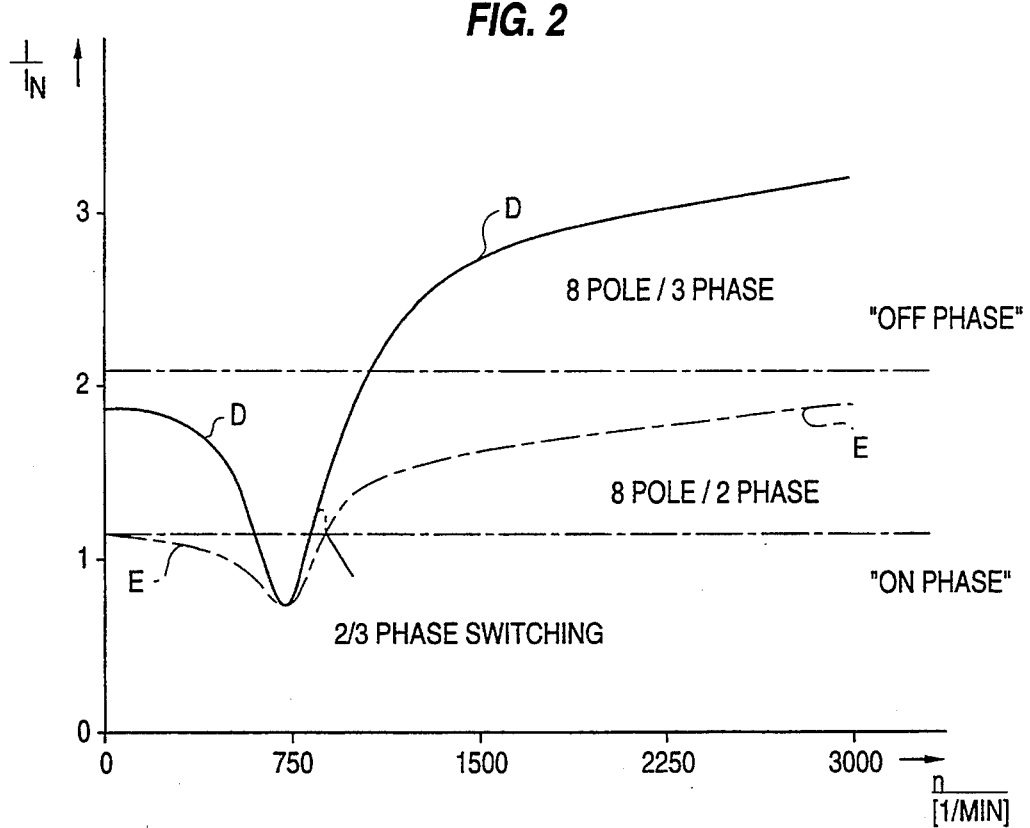

K1 = SLOW SPEED
K2 = FAST SPEED

METHOD AND APPARATUS FOR SWITCHING BACK A CHANGE-POLE MOTOR

FIELD OF THE INVENTION

The invention relates to a method for switching back a change-pole motor to the lower speed, in which initially there is a two-phase switching back to the lower speed, as well as to an apparatus for switching in the third phase of a change-pole motor, in which initially there is a two-phase switching back to the lower speed.

BACKGROUND OF THE INVENTION

Change-pole motors are asynchronous motors, whose stator houses more than one winding system. By switching in the particular stator winding, they make it possible to operate at different output speeds. The speeds result from the rotary frequency and the number of poles and are therefore in an integral relationship to one another. In general, the stator windings are independent, physically separated windings.

The different uses require not only the switching in and out of each individual speed, but also the switching between the speeds. The switching in of each speed with the motor stationary only differs from a single-revolution motor in that the run-up time is greater as a result of the relatively higher dead weight of the change-pole motor. The switching between the speeds and in particular the switching back to the lower speed represents a new situation with a behavior typical to a change-speed motor. There is a switching back torque, which reaches a multiple of the starting torque. This moment surge effects the drive mechanism through increased wear and vibrations and by increased noise evolution. For physical reasons the speed moment pattern is much higher in supersynchronous than in subsynchronous operation. This more particularly applies for the generating pull-out torque, which significantly determines the hardness of switching back.

In order to avoid or reduce to an acceptable amount the above-described disadvantages when switching back change-pole motors, a number of different technical measures are used.

In two-phase operation a running rotary field motor develops a torque, which is smaller than in three-phase operation and is elliptical. The choice of the two phases has no influence on the torque pattern. The two-phase switching back method achieves the desired moment reduction in the supersynchronous operating range. The problem is that immediately prior to synchronous speed it is necessary to switch back to three-phase operation.

If the switching in of the third phase takes place too early and therefore during the generating pull-out torque, then the switching back surge is only inadequately reduced. However, if switching in takes place too late, this means that the drive operates with a greatly reduced torque during motor operation and this is well below the nominal torque. This state must be reliably avoided particularly in the case of lifting gear.

The effectiveness of the described method is significantly determined by the accuracy of the switching in time of the third phase. The least effort and expenditure occur with the time-delayed switching in, but this only functions in a satisfactory manner in exceptional cases, because the duration of the braking phase is rarely constant in practical operation. The switching in as a function of the measured speed takes place much more accurately and functions freely from external influences. However, the disadvantage of this method is the technical expenditure with respect to the measuring device and the installation.

This method with a "heavy fan" or an additional flywheel mass is often used, because the technical expenditure is low and it requires no additional control. Thus, there are no corresponding contactors, electronic controls, as well as adjustment and installation. The additional flywheel mass is frequently in the form of the actual fan.

Operation is based on the fact that the additional flywheel mass is a dynamic energy store and reduces the acceleration processes during speed switching. It is disadvantageous that this process not only acts during switching back, but also during each starting process. A further and very significant disadvantage is based on the increased losses. During each starting and switching process the motor function in tilted operation and, consequently, suffers from losses caused by the very principle and these are exacerbated during longer starting and delay phases. It is not possible to recover the kinetic energy from the flywheel mass.

The permitted operating frequency of motors used in timed operation decreases considerably or requires additional measures with respect to the thermal stability and additional cooling. Apart from the technical costs involved, the running costs with respect to the increased energy losses constitute an important disadvantage of this method.

SUMMARY OF THE INVENTION

The aim of the invention is to reduce the switching back torque of change-pole motors in such a way that it roughly corresponds to the starting moment or torque. The disadvantages of the above-described methods with respect to operation, technical expenditure and operating costs are to be avoided. The pole-change motors used must not require any special additional devices such as a tachometer.

According to the invention, a method of the aforementioned type is proposed wherein, on dropping below a specific switching current, the third phase is switched in. An apparatus according to the invention for performing the method is characterized by an ammeter in a switched in phase, a comparator for comparing the actual current with a switching current value and a switch in the third phase to be switched in.

Thus, the invention avoids a time-controlled switching in of the third phase and also the expenditure necessary for speed measurement and instead directly uses the current for determining the switching in time for the third phase. It has been found that after switching back to two-phase operation, prior to synchronous operation the initially relatively constant current drops markedly, so that the current drop brings about a switching in of the third phase. Preferably, the third phase is switched in if the current in two-phase operation has dropped to roughly half compared with its initial value. It is possible to operate standard motors as a result of the method and apparatus according to the invention.

An accurate fixing of the switching current value can take place in that the size of the switching current value from the two-phase current is determined in subsynchronous operation, in that for setting the switching current value in subsynchronous two-phase operation the switching values are repeatedly increased until the third phase is switched in at a suitable switching current value.

The special nature of the invention is that the switching in of the third phase takes place automatically directly prior to synchronous speed. This is the optimum switching in time, because there is no longer any moment increase on passing to the three-phase characteristic and the full torque is available on passing into motor operation.

According to preferred developments of the apparatus the switching device has an electronic switch in the third phase, with the electronic switch being a triac or has two antiparallel thyristors in the third phase. For the switching of the igniting voltage of the electronic switch, triac or thyristor, it is also possible for the switching device to have a relay or an optical coupler.

According to further developments of the apparatus according to the invention, there is an indicator for indicating the switching in of the third phase of the motor and an input-side rectifier. Such an indicator is useful for putting into operation.

The apparatus according to the invention is an electronic additional device, which, in conjunction with commercial change-pole motors, avoids the disadvantage of hard switching back. The device is only connected in two phases of the motor feed line for the high-pole winding and does not require external switching members or an additional power supply.

The switching in time is controlled by electronics, requiring no additional information via sensors or the like. The optimum switching time is exclusively determined from the electrical data which are determined within the switching device via the motor feed line.

Thus, the invention is based on the two-phase switching back to the lower speed. According to the invention, the switching in of the third phase takes place automatically directly prior to the synchronous speed by current measurement. The switching element is constituted by a power semiconductor such as a triac or an antiparallel thyristor circuit. The switching electronics can be supplied with powder directly from the motor system, namely, from the phase whose current is measured. The optimum switching time is exclusively determined from the electrical data of a motor feed line switched in during two-phase switching back to the higher-pole winding. The signal electronics are supplied with power from the energy of the current transformer measurement signal.

BRIEF DESCRIPTION OF THE DRAWINGS

Further advantages and features of the invention can be gathered from the claims and the following description of preferred embodiments of the invention with reference to the attached drawings, wherein:

FIG. 1 is a graphical illustration of motor characteristics in motor and generator, three and two-phase operation in a change-pole motor;

FIG. 2 is a graphical illustration of the current pattern in a change-pole motor.

DETAILED DESCRIPTION

Figure 3:
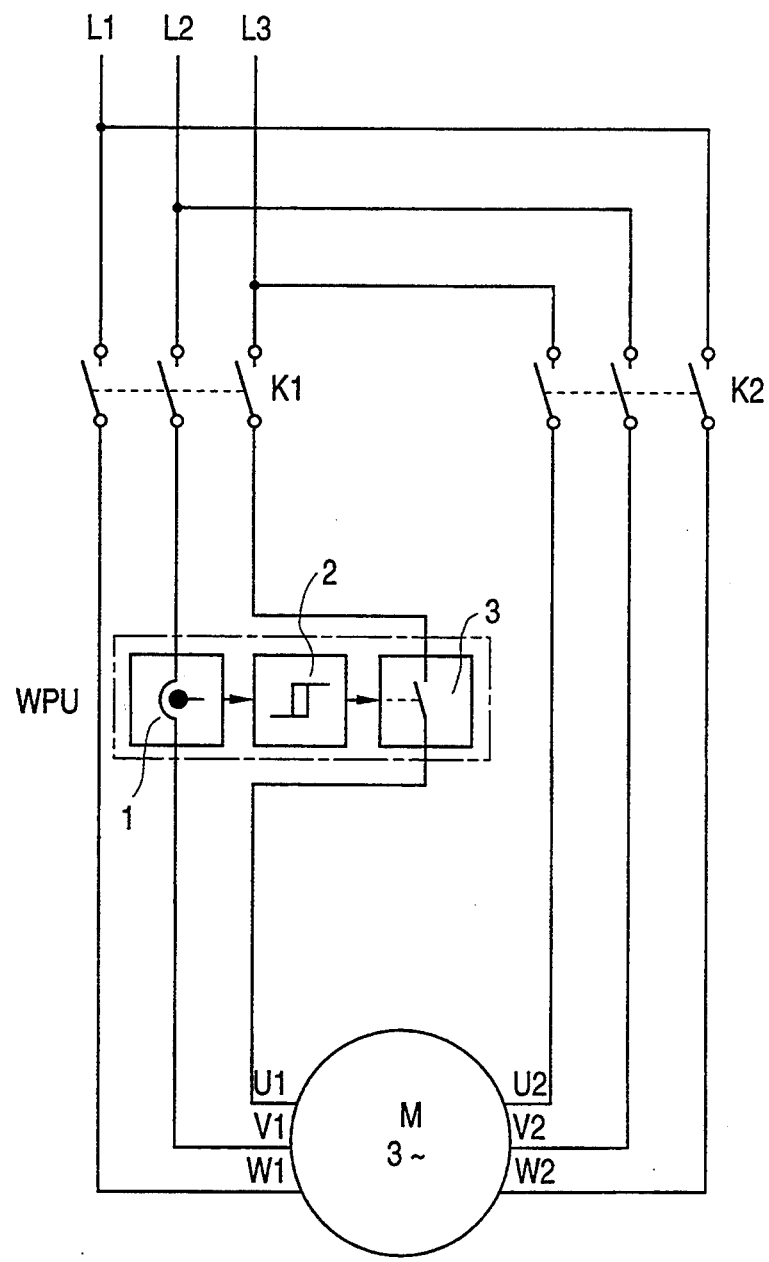
FIG. 3 is a block circuit diagram of the apparatus according to the invention for switching in the third phase in a change-pole motor.

FIG. 1 shows the torques in a change-pole motor. Curve A represents the torque over the speed for the small pole pair number and therefore the higher speed. Curve B represents the torques for three-phase operation of the higher pole pair number and therefore lower speed. It is clear that, in supersynchronous or generator operation (to the right of the curve zero), the absolute torques are considerable and well above those for the lower pole pair number according to curve A. Thus, on switching back from the higher speed to the lower speed and therefore from curve A to curve B considerable torques would occur, which would considerably stress the mechanism, namely, the motor and the machine driven by it.

Curve C shows the torques in two-phase operation for the higher pole pair number and therefore the lower synchronous speed. It can be seen that, on switching back in supersynchronous operation from the lower pole pair number at the speed given by the latter to the higher pole pair number, the torques are roughly the same as in the preceding motor operation at the higher speed (curve A). It can therefore be established that the torques in two-phase operation on passing to subsynchronous speeds, i.e. motor operation, are much lower for the higher pole number, so that there is then a risk of falling down in the case of lifting gear, whereas substantially no energy is supplied to a chassis. However, in motor operation and with three-phase switching in at higher speed, the torque again rises to the torque range of the lower pole number.

Thus, it can be gathered from these torque curves that it is desirable to switch from motor operation with the smaller pole pair number (higher speed curve A) initially to two-phase operation for the higher pole number (lower synchronous speed curve B) and then at the lower synchronous speed to switch in the third phase and therefore switch the high pole pair number into three-phase operation (curve B).

FIG. 2 shows the curve over the speed with the high pole pair number and therefore the low synchronous speed. Curve D shows the current in three-phase operation, whereas curve E shows it in two-phase operation. It is clear that, on switching in only two phases (curve E) in motor operation, the current remains below a value, as assumed close to synchronous speed during generator operation. In motor operation with two switched in phases the current value is determined at which, after switching back into generator operation, starting from the two phases, the third phase is to be switched in (phase on). For this purpose, by means of a potentiometer, a current value is set and, during several passes, is increased until in motor operation there is a switching in of the third phase, i.e. a switching from curve E to curve D in FIG. 2. This current value is then taken as the switching current value for the switching in of the third phase in generator operation, after initially the switching back from the high speed to the lower speed has taken place in two-phase operation, as explained hereinbefore.

An apparatus or circuit according to the invention (FIG. 3) provides for this purpose an ammeter 1 in one of the phases switched in in two-phase operation, e.g. L2, and it initially closes a switch 3 by of a comparator 2 in the phase initially not switched in in two-phase operation, such as, e.g. the third phase L3, so that it is also switched in on reaching the specific switching current value and is therefore switched to the three-phase mode for subsynchronous or motor operation. Phase L1 is performed. The connectors for switching in the lower or faster speed are designated K1 or K2.

Figure 4:
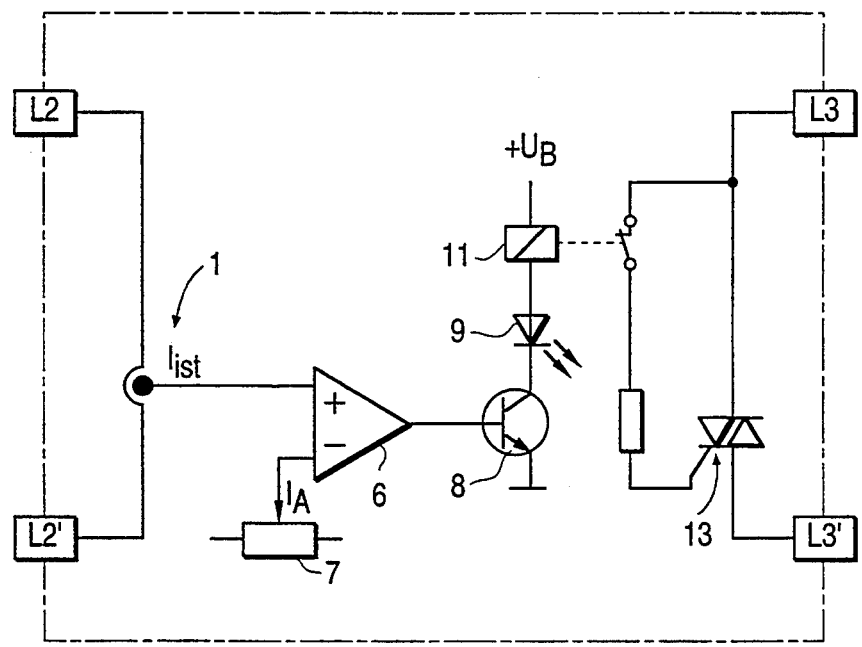
FIG. 4 is a schematic view of a first embodiment of the apparatus according to the invention for the switching in of the third phase in a change-pole motor with a triac as the switch.
Figure 5:
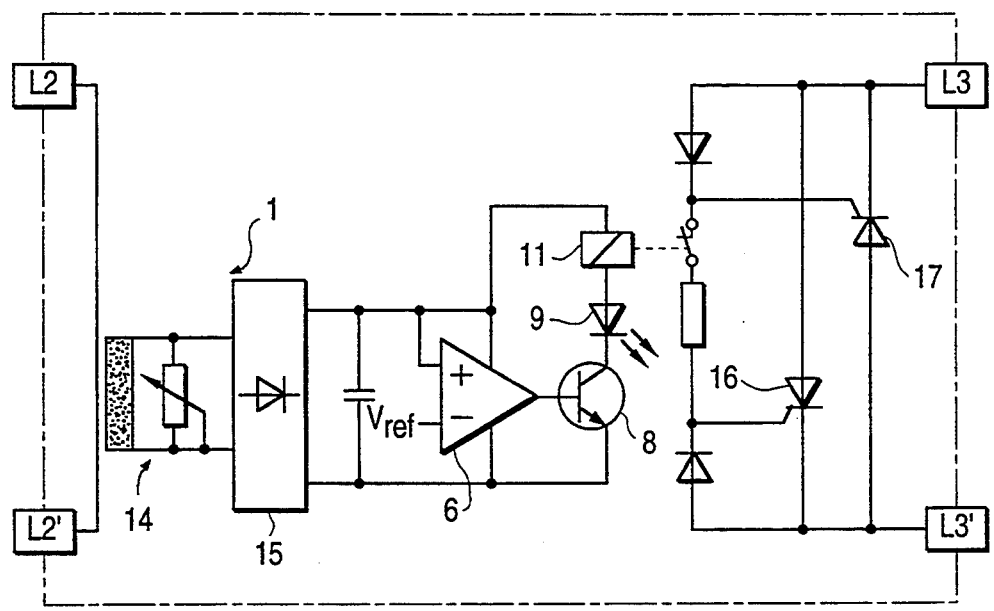
FIG. 5 is a schematic view of another embodiment of the apparatus according to the invention with antiparallel-arranged thyristors as switches.

Specific embodiments of the apparatus according to the invention are shown in FIG. 4. Once again L2, L2' designate a phase of the motor windings switched in in two-phase operation. Once again 1 designates the current measurement and current taken from this phase. The current can be taken or collected across current-voltage transformers 14 and a rectifier 15 (FIG. 5). It is supplied to one input of a comparator 6, whose other input is supplied with the indicated switching current value (reference value $V_{ref}$) across a potentiometer 7 (FIG. ). The circuit also has a transistor 8 to which is connected both an indicator 9 and a switch 11, with the switching being an optical coupler or a relay. By the switch 11 an electronic switch 13 in the third phase connected into the motor, such as phase L3, L3', is connected through. As shown in FIG. 4, the electronic switch 13 can be a triac which operates in bidirectional manner.

Instead of this two antiparallel thyristors 16, 17 can be arranged in parallel in the feed line or lead of the phase L3, L3', but in this case require in each case a switching signal for operation (FIG. 5).

The comparator 6 has a switching hysteresis for the switching on and off of the third phase as a function of the measured current. The hysteresis is also changed in proportion on varying the switching level.

On switching back to the high-pole winding, a current is formed in three-phase operation, which far exceeds the "phase off" level (FIG. 2). This ensures that the circuit immediately passes into a two-phase operation. If the drive now approaches synchronous speed, the current in two-phase operation drops and falls below the "phase on" switching level (FIG. 2), so that the third phase is again switched in. The current which now appears has a slight increase, but which is quite sufficient in order to again exceed the "phase off" switching level. Thus, the system remains in three-phase operation. It is important when choosing the switching thresholds that, in motor operation, the current does not exceed the "phase off" switching threshold. This must also not occur if the motor is loaded to blockage, which would simultaneously also correspond to the state of starting from speed 0.

The correct switching level is set with the motor stationary. For this purpose the start occurs with a low switching in level and the high-pole winding is switched in. Through the low switching level the "phase off" threshold is exceeded and the motor is operated in two-phase manner and develops no torque from the speed 0. The switching level is now slowly raised until the "phase on" level exceeds the two-phase starting current of the stationary motor. They hysteresis fixedly associated with this switching level brings about a "phase off" switching level, which is certainly above the three-phase starting or short-circuit current of the motor. The incorporated light-emitting diode shows this switching process and therefore also serves as a setting aid.

The essential prerequisite for the operation of the circuit is the fact that the two-phase current in the synchronous operating point is well below that in a standing motor when the adjustment is carried out. In the case of lifting gear it is obvious to keep the motor brake on during the adjustment. This is not a problem if the motor is only connected to two phases. If the third phase is automatically switched in for the correct setting, immediately thereafter the mains must be disconnected or the brake released, so that the motor is not operated in this state for an unnecessarily long period (brake wear or motor stressing).

We claim:

1. A method for switching back a change-pole motor to a lower speed of the motor, the method comprising the steps of initially switching back to a lower speed of the motor when two phases of a power supply are supplied to the motor, and switching-in a third phase of the power supply upon a dropping of motor current below a predetermined switching current.

2. A method according to claim 1, wherein the size of the switching current is determined from a two-phase current in a subsynchronous operation.

3. Method according to claim 2, wherein, for determining the switching current in the subsynchronous operation, a switching threshold is continuously increased until a third phase is switched in at the predetermined switching current.

4. A method according to claim 2, further comprising comparing the current of one phase with the predetermined switching current, and switching in the third phase when the current of said one phase drops below said predetermined switching current.

5. A method according to claim 4, wherein a signal representative of a current of said one phase is used for switching.

6. A method according to claim 1, further comprising comparing the current of one phase with the predetermined switching current, and switching in the third phase when the current of said one phase drops below said predetermined switching current.

7. A method according to claim 6, wherein a signal representative of the current of said one phase is used as a power supply to enable the switching-in process.

8. An apparatus for switching-in a third phase of a change-pole motor, in which initially there is a switching back to a lower speed of the motor when two phases are applied to the motor, wherein an ammeter is provided in a supply line for the motor conducting one of said two phases, a comparator compares the actual current measured by said ammeter with a predetermined switching current, and a switching-in device is provided for enabling a switching in of the third phase.

9. An apparatus according to claim 8, wherein the switching-in device includes an electronic switch in the third phase.

10. An apparatus according to claim 9, wherein the electronic switch is a triac.

11. An apparatus according to claim 9, wherein the electronic switch has two anti-parallel thyristors in the third phase.

12. An apparatus according to claim 9, where a switching device is provided for triggering the electronic switch.

13. An apparatus according to claim 12, wherein the switching device includes a relay.

14. An apparatus according to claim 8, wherein the switching-in device has an optical coupler.

15. An apparatus according to claim 8, wherein an indicating device is provided for indicating the switching-in of the third phase of the motor.

16. An apparatus according to claim 8, further comprising a rectifier disposed on an input side of the apparatus.

17. An apparatus according to claim 8, wherein a power supply for the switching-in device is provided by a signal representative of a current measured by the ammeter.

* * * * *